United States Patent Office 2,996,557
Patented Aug. 15, 1961

2,996,557
CATALYTIC DEHYDROGENATION METHOD
Charles R. Noddings, Midland, Mich., assignor to The Dow Chemical Company, Midland, Mich., a corporation of Delaware
No Drawing. Filed June 30, 1958, Ser. No. 745,329
11 Claims. (Cl. 260—680)

This invention concerns an improved method of producing aliphatic conjugated diolefines by the dehydrogenation of olefines, containing four or more carbon atoms in the unsaturated chain of the molecule, in the presence of dehydrogenation catalysts of the calcium nickel phosphate type.

This application is a continuation-in-part of my application, Serial No. 547,301, filed November 16, 1955, and now abandoned.

The improved method of the invention is a modification of a known method for the same purpose. The improved method provides a modified combination of steps and operating conditions which prevents the catalyst from undergoing as rapid decrease in activity or in selectivity, for the production of a diolefine rather than side reactions, as has heretofore occurred in practice of the known method and which permits production of the diolefines at higher olefin-conversion rates over a long period, e.g. six months or more, than have heretofore been thought feasible, and in amounts which are unusually large when expressed on a basis of the amount of catalyst employed.

The invention will be described with reference to the production of butadiene-1,3 from any one or more of the normal butylenes, but it can similarly be applied in dehydrogenating other aliphatic mono-olefines containing at least four carbon atoms in the unsaturated chain of the molecule to form aliphatic conjugated diolefines.

Dehydrogenation catalysts of the calcium nickel phosphate type and methods of making them are well known. They comprise a normal calcium nickel phosphate material which is formed by precipitation from a non-acidic aqueous medium and which contains an average of from 6.5 to 12, usually from 7.5 to 9.2, atoms of calcium per atom of nickel. They may consist entirely of such calcium nickel phosphates, but usually a minor amount, e.g. from 0.05 to 30 and in most instances from 1 to 5 percent by weight, of chromium oxide is admixed therewith as a promoter. The catalytic material usually is pressed into the form of pellets or tablets of sizes convenient for use in carrying out the dehydrogenation reaction.

The above-mentioned catalysts are known to be highly effective in promoting the thermal dehydrogenation of olefines, containing four or more carbon atoms in the unsaturated chain of the molecule, to form conjugated diolefines and to be highly selective in catalyzing such a reaction rather than undesired side reactions such as carbonization, or cracking, of the olefine starting compound to form carbonaceous deposits or hydrocarbons having a lesser number of carbon atoms in the molecule, e.g. methane, ethane, propane, ethylene, or propylene, etc. However, both the activity and the selectivity of such a catalyst are dependent on the care and skill employed in making the same and on the conditions under which it is used. During use in the conventional process for the manufacture of butadiene-1,3 from normal butylenes, such catalysts have gradually decreased both in activity and in selectivity for the production of butadiene rather than by-products. An increase in the percent of butylene consumed per pass through a bed of the catalyst has, in past practice, usually resulted both in a decrease in the percent yield of butadiene based on the amount of butylene consumed and in a more rapid decrease than otherwise occurs in the selectivity value of the catalyst (as determined under a standard set of test conditions) for the production of butadiene rather than by-products. These effects have been particularly pronounced when the conversion, i.e. consumption, rate per pass of the butylene was increased above about 40 percent. Accordingly, in the commercial production of butadiene by the dehydrogenation of normal butylenes in the presence of such catalysts, the reaction conditions, e.g. vapor flow rates, reaction temperature, and proportion of inert diluent employed, have usually been such as to obtain a conversion of from 30 to 35 percent of the butylene per pass through the bed of catalyst. These conditions have permitted continuous use of a bed of such catalyst for from 6 to 9 months before the activity and/or selectivity values of the catalyst decreased to a point rendering further use of the catalyst unprofitable. A total of less than 400, e.g. from 250 to 350, pounds of butadiene was produced per pound dry weight of the catalyst in such conventional process.

In the known method for the production of butadiene from normal butylenes with such a catalyst, superheated steam is passed through a reaction chamber containing a bed of the catalyst to sweep air from the chamber and to bring the catalyst bed to a temperature in the vicinity of that at which the dehydrogenation reaction is to be carried out. When starting the process, the bed may gradually be heated as just described, but thereafter each such step of purging the bed of oxygen or hydrocarbon vapors is usually accomplished by feeding the steam alone to the bed for from 2 to 5 minutes or thereabout. The reaction is preferably carried out at temperatures between 575° and 650° C., but it can be conducted at lower or higher temperatures, e.g. at from 500° to 750° C. After sweeping air from the reaction chamber with the steam, a mixture of one part by volume of hydrocarbon vapors comprising butylenes and from 10 to 20 volumes or more (usually about 20 volumes) of steam, which vapor mixture has been formed at or brought to a temperature suitable for the reaction, is passed through the chamber and the bed of catalyst therein, usually for from 45 to 60 minutes or thereabout. The conditions, of vapor flow rate, reaction temperatures, and proportions of steam present, are usually such as to effect a conversion, i.e. consumption, of from 30 to 35 percent of the normal butylenes per pass through the catalyst bed. The effluent vapor mixture is passed through heat exchangers and other cooling devices to condense the water and hydrocarbons therefrom. The hydrocarbon layer of the condensate is separated from the aqueous layer and fractionated in known manner, e.g. by distillation, to separate the butadiene product. Unconsumed butylene is recycled in the process.

During use in the dehydrogenation reaction, the catalyst gradually accumulates a small amount of carbon or non-volatile organic material and decreases in activity. Accordingly, flow of the hydrocarbon starting material is interrupted from time to time, gaseous hydrocarbons are swept from the catalyst bed with steam, and air admixed with an equal volume or more (usually about six volumes) of steam is passed through the catalyst bed, e.g. at temperatures between 450° and 700° C. and usually for from 35 to 55 minutes or thereabout, to oxidize and remove the carbonaceous or organic material and thus reactivate the catalyst. The flow of air is then interrupted, the catalyst chamber is swept free of air with steam, e.g. by feeding superheated steam alone to the bed for from 2 to 5 minutes or thereabout, and introduction of the olefine-containing starting material in admixture with steam is resumed.

The above-described operations of purging the catalyst bed by passing superheated steam through the bed, then passing the reaction mixture of steam and the olefine-containing hydrocarbons through the bed, next regenerating the catalyst by passing a mixture of steam and air or oxygen through the bed, and again purging the bed with steam alone, constitutes an operating cycle of the process. This cycle is repeated many times over, usually with little or no change in procedure from one cycle to the next, except that the dehydrogenation temperature is gradually raised, because of the decrease in activity of the catalyst, to maintain the butylene conversion values of from 30 to 35 percent per pass or thereabout. When operating in the manner just described, a bed of the catalyst usually has a useful life of from 6 to 9 months of continuous service, during most of which time the selectivity value for the catalyst decreases only gradually and remains in the vicinity of 90 percent. Toward the end of the period there is usually a sharp and spontaneous rise in the maximum temperature in the catalyst bed and a large amount of carbon forms in the bed and renders the latter unsuitable for further use. This occurrence is accompanied by and may result, at least in part, from further decreases in the activity of the catalyst and in the selectivity of at least a portion of the catalyst bed.

In the course of research as to the above-described conventional method, the following observations or discoveries were made. During each cycle of the process, fairly wide temperature changes tend to occur at most, if not all, points in the catalyst bed and considerable temperature differences often occur, at least momentarily, in the bed as a whole. The kind and extent of the temperature changes are dependent upon a combination of variable factors such as the proportions of steam in the vapor mixtures of steam and butylene and of steam and air which (except for the brief intervening steam purging steps) are alternately fed to the catalyst bed, the temperatures and flow rates of these vapor mixtures, the heats of reaction of the endothermic and exothermic reactions which take place in the bed, and the rates at which heat is lost from, or supplied to, the bed through the walls of the catalyst chamber. The readiness with which the bed and the vapor mixture in contact therewith may be heated or cooled by a flow of heat through the walls of the catalyst chamber decreases with increase in the size, particularly the width or diameter, of the bed. When using a catalyst bed of a commercial size, e.g. having a depth of 2 feet or more and a diameter or width of 2 feet or more, the reactions usually occur under predominantly adiabatic conditions and the temperature changes which occur in the catalyst bed, especially in its center region, are due for the most part to heat consumed or generated by the chemical reactions that take place in the bed. Such temperature changes are typically as follows. In the step, of an operating cycle, of feeding a mixture of superheated steam and butylene to the bed of catalyst an endothermic dehydrogenation of the butylene to form butadiene occurs with a result that the temperature tends to decrease as the vapors flow through the bed. During the step, in an operating cycle, of regenerating the catalyst by passing a mixture of superheated steam and air or oxygen through the bed, the temperature at a mid-point in the bed sometimes initially decreases momentarily but, regardless of whether such decrease occurs, the temperature usually rises rapidly, e.g. in from 5 to 15 minutes, to 25° C. or more above the temperature of the feed mixture of steam and air or oxygen and thereafter decreases to about the temperature of this feed temperature. However, there have been instances in which the mid-bed temperature failed to rise in such rapid manner to a value as great as, or above, the temperature of the vapor feed mixture and in these instances the catalyst had decreased in selectivity and was wild, i.e. tended to cause an excessive amount of carbonization or cracking when employed in the dehydrogenation step of the process.

It is evident that the momentary decrease in temperature which sometimes occurs at the start of the catalyst regeneration step cannot be due to oxidation of carbonaceous or organic deposits and probably is due to momentary occurrence of an endothermic reaction such as that of decomposing minor amounts of hydrocarbons retained in the catalyst bed. The occurrence of such momentary temperature drop at the start of a regeneration step is not believed to have any particular significance as regards the process as a whole. However, the extent of the temperature rise which occurs during the catalyst regeneration step appears to be related to, or a pre-indication of, the decreases in activity and/or selectivity of the catalyst that limit the effective life of the latter. The occurrence of wide temperature changes and temperature differences in the catalyst bed during use in the process apparently have little, if any, effect on the properties or the life of the catalyst, provided that the bed temperature rise which takes place during the regeneration step is controlled as hereinafter described.

The above facts tended to confirm a belief, held for some time, that such catalysts are capable of repeatedly undergoing oxidation and reduction reactions and that they are most selective, in catalyzing the dehydrogenation of normal butylenes or higher homologues thereof to form a diolefine rather than other reactions, when at a point of balance between the fully oxidized and the fully reduced forms of the catalyst.

On a basis of the above-observations and discoveries it was hypothesized that the catalyst undergoes an endothermic reduction during each olefine dehydrogenation step of the process; that the momentary decrease in catalyst bed temperature which sometimes, but not always, occurs at the start of a catalyst regeneration step is due merely to a consumption of heat in vaporizing or decomposing a minor amount of hydrocarbon material in the bed and can be disregarded as an incidental occurrence having little if any effect on the useful life of the catalyst; and that the subsequent rise in temperature which usually occurred during the catalyst regeneration step was due in part to oxidation of carbonaceous or organic material and in part to oxidation of the catalyst. It was further hypothesized that the decrease in selectivity of the catalyst in promoting the formation of a diolefine rather than by-products was due to the extent of either or both of the reactions for the reduction and oxidation of the catalyst and that if said reactions could be prevented from occurring to more than a minor extent the effective life and/or the selectivity of the catalyst in promoting the dehydrogenation of the olefines to form diolefines rather than by-products could be prolonged. It was further hypothesized that as the catalyst becomes more extensively reduced it becomes less readily reoxidized to the state at which it possesses an optimum selectivity value. It was still further hypothesized that since the extent of the temperature changes that take place during the catalyst regeneration step appear to be a rough measure of the extent to which the catalyst has been, or becomes, reduced or oxidized in ways decreasing its selectivity, it might be possible, by controlling such temperature changes in the catalyst bed during the catalyst regeneration step, to limit the extent to which the catalyst alternately becomes reduced and oxidized during use in the process and to thus prolong the life and selectivity of the catalyst.

In order to determine whether the temperature rises which occur at the various points in the catalyst bed are either excessive or are less extensive than is desirable it is necessary to compare the maximum catalyst bed temperature reached at a point of measurement with a reference temperature which also is a characteristic of the reaction system as a whole. It has been found that, when using a commercial size of catalyst bed, e.g. two feet or more in width or diameter, a suitable temperature value for use as such reference value is the average of the vapor feed temperatures employed in a dehydrogenation step and in the next following catalyst regeneration step of the process.

When using a catalyst bed of laboratory size, e.g. a tube of 2 inches or less internal diameter containing the catalyst bed, it is difficult, even when encasing the tube with thermal insulating material, to avoid sufficient loss or gain of heat through the walls of the vessel to alter considerably the bed temperatures from those that are measured when using a larger, e.g. wider, bed under otherwise similar conditions. In such instances in which the bed is cooled or heated by heat exchange through the walls of the catalyst chamber, it is necessary to correct the above-mentioned reference value in accordance with the effect of such heat exchange on the temperature at the point where the bed temperatures are measured. The temperature changes, e.g. the drop or rise in temperature, of the vapors which result from heat transfer through the walls of the catalyst bed during travel of the vapors from the point of feed to the point of bed temperature measurement is added algebraically to the average of the vapor feed temperatures during successive dehydrogenation and catalyst regeneration steps in order to obtain the corrected reference value which is to be compared with the maximum bed temperature reached in said regeneration step. When using a narrow, e.g. laboratory size, bed of catalyst, it is the average of the temperatures measured at a given point in the bed at the start of a dehydrogenation step and at the close of the next catalyst regeneration step which is used as a corrected reference value for comparison with the highest temperature reached at said point in said regeneration step. This amounts, in effect, to being an average of the temperatures of the vapors delivered to the point of bed temperature measurement at the times just stated. As hereinbefore mentioned, such a correction of the reference value is not necessary when using a catalyst bed of a commercial size and measuring the bed temperatures near the center of the catalyst bed, i.e. an average of the temperatures of the vapors fed to the bed as a whole in successive dehydrogenation and catalyst regeneration steps is then used as a reference value for comparison with the highest temperature reached near the center of the bed during said regeneration step.

Since the alternate dehydrogenation and regeneration steps are usually repeated from one cycle to the next with, at most, only a limited and gradual feed-temperature increase, e.g. of from 0° to 50° C. or thereabout, over a period of several months, except possibly for brief or accidental feed-temperature changes in a few of the operating cycles, it is best, once the process is well under way, to use the average of such vapor feed temperatures for a number, e.g. ten or more, immediately preceding operating cycles as a reference value for comparison with the temperature rise measured in the catalyst regeneration step of a given cycle. It is believed that a reduction in the difference between this reference value and the maximum temperature reached at a point in a mid-section of the catalyst bed during the catalyst regeneration steps of the process is an indication that the extent of reduction of the catalyst during the dehydrogenation steps and the extent of oxidation of the catalyst during the regeneration steps are approaching a condition of balance with one another.

It has also been found that by preventing occurrence, during most, and advantageously all, of the catalyst regeneration steps involved in a run for the production of butadiene with a bed of the catalyst, of a temperature difference (hereinafter called "delta C") of more than 10° C. between the aforementioned "reference temperature" and the highest temperature reached, during the catalyst regeneration steps, at any point remote from the point or points of vapor feed and preferably an inch or more within the bed from outer surfaces of the latter (particularly in the central region of the bed), the decreases in the activity and/or selectivity values of the catalyst which have heretofore occurred, in the aforementioned known method of producing butadiene using the catalyst, can be prevented or rendered less extensive.

During prolonged use of the catalyst for the production of butadiene or other conjugated diolefin, said temperature difference may occasionally exceed 10° C. for relatively brief periods, e.g. of from 1 to 10 and in some instances as many as 50 or more successive operating cycles, without causing serious damage to the catalyst, but such occurrence constitutes a warning that steps should be taken, preferably as soon as possible, to bring the temperature difference within said range in order to prevent damage to the catalyst. In practice of the invention, the delta C values are prevented from exceeding 10° C. during at least 70, and preferably 85 or more, percent of the time in which a bed of the catalyst is in service in the butylene dehydrogenation process. For purpose of accuracy, measurements to determine changes in the catalyst selectivity value should be made over a number, e.g. 10 or more, operating cycles of the process, since such change, if any, may be small in a single cycle. The activity of the catalyst does not decrease as rapidly in practice of the present invention as when operating in accordance with the aforementioned conventional method under otherwise similar conditions. In general, the method of the invention permits highly effective use of the catalyst, e.g. at higher than the usual reaction rates of olefine per pass through the catalyst bed, for the production of aliphatic conjugated diolefines under a novel set of conditions that prolong the useful life of the catalyst. It permits satisfactory use of a bed of the catalyst for the production of more than 400 pounds of butadiene or other aliphatic conjugated diolefine from a corresponding mono-olefine per pound dry weight of the catalyst.

More specifically, it has been found that the temperature changes that occur in a bed of the catalyst during the butylene dehydrogenation steps and the catalyst regeneration steps can be rendered less extensive by subsequently employing shorter operating cycles in the process, i.e. by feeding smaller amounts of butylene and of oxygen to the catalyst bed during each of the subsequent cycles. This is one way in which the difference between the above-mentioned reference value and the maximum temperature reached at a point in the catalyst bed during the regeneration steps can be reduced. Although the alternate reactions for the reduction and the oxidation of the catalyst can both thus be rendered less extensive, a mere employment of shorter operating cycles, or vice versa, does not necessarily lead to a condition of balance between said reactions.

It has further been found that both the kind and the extent of the temperature changes that occur in the catalyst bed during the catalyst regeneration steps can be varied and controlled by changes in the relative proportions of butylene, oxygen and steam in the butylenes and steam and the oxygen or air and steam mixtures alternately fed to a catalyst bed during the process. In general an increase in the effective proportion of oxygen fed to the bed, relative to the amount of butylene alternately fed to the bed, usually results in an increase in the temperature rise within the bed during the regeneration step, and vice versa. Although the relative proportions of butylene and oxygen alternately fed (each in admixture with steam) to the bed can be varied in any of several ways, e.g. by changes in the relative rates at which butylene and oxygen or air are alternately fed to the bed or, instead, by changing relative durations of the alternate dehydrogenation and regeneration steps of the process, the kind and extent of the temperature changes that occur in the bed during the catalyst regeneration steps can more conveniently be varied and controlled by changes from time to time in the relative proportions of steam and oxygen or air in the mixture thereof which is fed to the bed during said steps. A change in the relative proportions in which steam and oxygen, or air, are fed as a mixture thereof to the catalyst bed in the regeneration steps has an effect other than that of merely changing the relative proportions in which butylene and oxygen or air alternately are fed to the bed. When operating in a manner such that the relative proportions of butylene and oxygen or air alternately fed to the bed are maintained constant, an increase in the proportion of steam in the vapor mixture of steam and oxygen or air that is employed in the regeneration steps causes a corresponding reduction in the amount of heat generated in the bed per pound mole of oxygen in the vapors fed to the bed during the regeneration steps, and vice versa. Apparently, such dilution of the oxygen by increase in the proportion of steam in the feed mixture causes a reduction in the proportion of the oxygen that reacts with the catalyst during passage through the catalyst bed in carrying out the regeneration steps. The net effect on the catalyst of such increase in proportion of steam employed in the catalyst regeneration steps (all other conditions being constant) is the same as that of reducing the proportion of oxygen relative to butylene in the vapor mixtures comprising these respective gases which are alternately fed to the catalyst bed. Therefore, an increase in the proportion of steam employed in the catalyst regeneration steps constitutes one way of reducing the proportion of effective oxygen (reactive with the catalyst) relative to butylene alternately fed to the catalyst bed of thereby decreasing the extent of the bed temperature rises which occurs in the catalyst regeneration steps of the process. For purpose of clarity, the last-mentioned, and preferred, mode of controlling the temperature changes in the catalyst bed during the regeneration steps will hereinafter be described in greater detail, but it is to be understood that any of the other modes of temperature control just mentioned, or any combination of these modes of control, can be used. All of the modes of control just mentioned are equivalent in effect and are within the scope of the invention.

As indicated above, the essential feature of the invention resides in steps for controlling the temperature changes, particularly for preventing excessive temperature rises, in the catalyst bed during the operations of passing a mixture of superheated steam and an oxygen-containing gas such as oxygen or air through the bed to oxidize and remove carbonaceous or organic deposits therefrom and thus reactivate, i.e. regenerate the catalyst. In general, an increase in the proportion of oxygen or air in this vapor feed mixture causes an increase in the temperature rise during the catalyst regeneration operation. Conversely, an increase in the proportion of steam, relative to oxygen or air, in the feed vapors causes a decrease in the extent of temperature rise, occurring in the catalyst regeneration operation.

The changes in the relative proportions of steam and air or oxygen employed in the catalyst regeneration steps can be effected during any one or more of such steps, but ordinarily it is not necessary that said proportions be changed while carrying out an individual catalyst regeneration step. The temperature changes occurring within the bed during such step, or more particularly the hereinbefore-mentioned "delta C" values for the numerical difference between the maximum temperatures reached in the bed during such steps and the average of the vapor feed temperatures in said steps and in the alternate butylene dehydrogenation steps, can satisfactorily be limited by controlling, and when necessary effecting changes in, the relative proportions of steam and air or oxygen employed in the regeneration steps during practice of the process as a whole.

The ratio by volume of steam to oxygen or air in the vapor feed mixture employed in the catalyst regeneration steps is advantageously varied from time to time as necessary to prevent the maximum temperatures reached in the major portion of the catalyst bed from varying by more than 10° C. from the hereinbefore-mentioned "reference temperature." The temperatures in the bed are preferably thus maintained within 5° C. of the reference temperature. As hereinbefore indicated, these temperature differences are also known as "delta C" values.

The major portion of the bed, within which the bed temperatures are measured, is a region remote, e.g. preferably 1 inch or more inward, from outer surfaces of the bed and comprising approximately the two-thirds of the bed volume remote from the point or points of feed of vapors to the bed. When feeding the vapors downward through the catalyst bed, the bed temperatures which are to be compared with the aforementioned reference temperature are preferably determined near the center of the bed, although temperatures measured at lower points well within the bed can also be used. In instances in which the vapor flow is upward through the bed, the bed temperatures are preferably measured in a center region of the bed or toward the top of the bed.

The process for the catalytic dehydrogenation of n-butylenes to form butadiene can be controlled by observing the temperature in the catalyst bed at a point remote from the vapor inlet and, in response to changes in "delta C," from one regeneration step to the next, away from a value of zero varying the above-mentioned ratio in a manner and to an extent causing the "delta C" values to approach zero.

For instance if the bed temperature during a regeneration step fails to rise rapidly, e.g. within 15 minutes, to within 10° C. of the aforementioned reference temperature a smaller proportion of steam or, conversely, a greater proportion of oxygen or air, may advantageously be used in the vapor feed mixture employed in subsequent regeneration steps so as to cause a more rapid or extensive rise in the bed temperature. If, as more frequently happens, the bed temperature rises more extensively than desired in a regeneration step, the proportion of steam may be increased in the feed mixtures to subsequent catalyst regeneration steps so as to cause the "delta C" values to decrease and approach zero. Such control can be accomplished manually. However, it is most satisfactorily accomplished automatically by use of conventional automatic control means such as electric motors, or other means, for opening or closing valves in the inlet lines for the steam and oxygen or air, which are actuated by a temperature responsive element. Such automatic control devices, or arrangements, are well known in the art.

Except for the above steps for control of the temperature changes in the catalyst bed during the catalyst regeneration operations, the steps and conditions employed in the present process are similar to those used in the hereinbefore described conventional process for the dehydrogenation of olefines having 4 or more carbon atoms in the unsaturated chain to produce aliphatic conjugated diolefines. In other words each cycle of the present process involves a conventional operation of thermally dehydrogenating such an olefine in the presence of a calcium nickel phosphate type of catalyst to form an aliphatic conjugated diolefine, which operation is followed by the operation of reactivating the catalyst by passing a vapor mixture of steam and an oxygen-containing gas therethrough. This cycle of the essential operations may be repeated many times over while varying the volume ratio of steam to oxygen or air in the feed mixtures to the catalyst reactivation steps so as to control the temperature in the manner described above. Other operations such as those of condensing and separating the products and recycling unconsumed olefinic material are conventional.

The method of the invention has been described with reference to the dehydrogenation of normal butylenes to produce 1,3-butadiene. However, it may be applied in similar manner for the dehydrogenation of other olefines having 4 or more carbon atoms in the unsaturated chain of the molecule to produce corresponding aliphatic conjugated diolefines. For instance, it may be applied in dehydrogenating isoamylene to form isoprene, in dehydrogenating 2,3-dimethylbutene-1 to form 2,3-dimethylbutadiene-1,3 or it may be applied in dehydrogenating 1-pentene to form piperylene, etc.

The following examples describe ways in which the invention has been practiced and illustrate certain of its advantages, but are not to be construed as limiting its scope.

EXAMPLE 1

A cylinder of 1 inch internal diameter was filled to a depth of 22 inches with catalyst pellets. Each pellet comprised about 98 percent by weight of calcium nickel phosphate, containing an average of 8.2 atoms of calcium per atom of nickel, and 2 percent of chromium oxide as a promoter. A test of the invention was started using two hour operating cycles. In each cycle, butadiene was formed by passing a vapor mixture of one part by volume of n-butenes and about 20 parts of superheated steam into the upper section of the cylinder and downward through the catalyst bed for one hour. The n-butene of 99.5 percent purity was fed into admixture with the steam at a rate of 150 volumes thereof (calculated as at 0° C. and 760 mm. absolute pressure) per bed volume of catalyst per hour. The flow of n-butenes was then interrupted and hydrocarbon vapors were quickly flushed from the bed by the continued flow of steam. A vapor mixture of one volume of air and about six volumes of superheated steam was then passed downward through the bed for about 52 minutes for purpose of regenerating the catalyst. The inflow of air was then interrupted and air was flushed from the bed by continued flow of the steam. The process as a whole consisted of repetitions of such operations in the relative order just given. The temperature, composition, and flow rate of the vapor feed mixture of n-butenes and steam were such as to cause an approximately 50 percent conversion, i.e. consumption, of the n-butenes per pass through the catalyst bed when the catalyst was first put in service. The composition and flow rate of this feed mixture was approximately the same in all of the dehydrogenation steps of the process, but the temperature of the feed mixture was varied somewhat at different stages of the reaction in an attempt to maintain a butene-conversion value of about 50 percent per pass. It may be mentioned that this conversion value, which is far higher than that employed in the hereinbefore-described conventional method for the manufacture of butadiene, was purposely employed for purpose of accelerating failure of the catalyst, if such were to occur. Employment of conditions causing such high conversion per pass of n-butenes when otherwise operating in accordance with the conventional method usually causes catalyst failure in from 1 to 3 weeks. In the present experiment the relative feed rates of air and steam to the catalyst bed were maintained constant during each individual catalyst regeneration step, but were varied from time to time during such steps of the process as a whole in an effort to maintain the hereinbefore-mentioned "delta C" values as small as possible. The test of the invention was started using steps and conditions as similar as possible to those employed in the aforementioned conventional process for the manufacture of butadiene. In each of the dehydrogenation steps of the process, the effluent vapor mixture was cooled to condense the steam and hydrocarbon products, and remaining uncondensed gas was collected and its volume was measured. The organic layer of the condensate was separated, weighed, and analyzed to determine the amount of 1,3-butadiene therein. The volume of the uncondensed gas is of significance since formation of such gas in amount greater than the amount of hydrogen theoretically generated in forming the butadiene can be due only to occurrence of undesired side reactions and indicates that the catalyst is, for the time being, acting in a wild manner, i.e. promoting side reactions. It is preferable that the wildness, i.e. excessive permanent gas formation, be avoided as nearly as possible because it may result in a rapid decrease in the activity and/or selectivity values of the catalyst. During the first 309 operating cycles of the process most of the "delta C" values were in a range of from 0 to 10° C., but the catalyst was often wild and the "delta C" values fluctuated considerably and in some instances were outside of the range just stated. During the period just stated the relative feed rates of steam and air in the regeneration steps were varied from time to time in an attempt to limit the "delta C" values. However, it was believed that the wildness of the catalyst and the fluctuations in the "delta C" value were due at least in part to occurrence of an excessive reduction of the catalyst during each of the dehydrogenation steps and excessive oxidation of the catalyst during the regeneration steps. For purpose of limiting the extent of these alternate reactions, subsequent operating cycles of the process were shortened to be of only one hour limitation, i.e. in each subsequent cycle the dehydrogenation of butylene was carried out for 30 minutes, the regeneration step was carried out for about 22 minutes and each of the steam purging steps required about 4 minutes. This shortening of the cycles reduced greatly the occurrence of wild catalyst behavior but it was necessary from time to time to change the relative feed rates of air and steam in the regenerating steps in order to avoid excessively large negative or positive values of "delta C." It may be mentioned that "delta C" is negative when the maximum bottom of bed temperature in a regeneration step is below the hereinbefore mentioned corrected reference temperature and that it is positive when the maximum bed temperature just mentioned is higher than said corrected reference temperature. In this experiment, except for a few instances in which the feed temperatures were changed, the vapor feed temperatures in the alternate dehydrogenation and catalyst regeneration steps were approximately the same. A number of operating difficulties occurred during the test of the invention. For instance, themocouples used for measuring the catalyst bed temperature burned out on three occasions and each replacement thereof involved some disturbance of the catalyst bed. This sometimes appeared to affect the results obtained during several operating cycles thereafter. Also, the steam service was interrupted for brief periods of time on each of two or three occasions and this affected the results for several cycles thereafter. Due apparently to these occurrences, the "delta C" values twice reached excessive negative values (due apparently to excessive reduction of the catalyst) and on each occasion large increases in the proportion of air employed in the catalyst regeneration steps and a considerable number of cycles under the thus-changed conditions were required to reduce the "delta C" values. In spite of these difficulties, the experiment was highly successful both in demonstrating that the "delta C" values can be controlled and limited by suitable variations from time to time in the relative proportions of air and steam employed in the regeneration steps, and in demonstrating that a reduction in the average "delta C" value prolongs the effective life of the catalyst over that otherwise exhibited and permits increases in the rate of butadiene production and in the amount of butadiene that can economically be produced per pound of catalyst over the rates and amounts of butadiene produced per pound of the catalyst when operating in accordance with the conventional method. The following table gives the length of operating cycle, the average temperature of the vapor feed mixtures to the catalyst in the alternate dehydrogenation and catalyst regeneration steps of the process, the rates of feed of air and of superheated steam into admixture with one another and thence through the catalyst bed in the corresponding regeneration steps, and the "delta C" values obtained over several periods of operation of the process. It also gives average values for the percent conversion of the butylene per pass and the percent selectivity of the catalyst in these same periods of the process. It also gives for said periods average values for the liters of uncondensed gas obtained per cycle of the process. It may be mentioned that the "percent selectivity" value for the catalyst carries the same meaning as the percent yield of butadiene, based on the amount of butylene consumed. The table indicates which of the successive operating cycles of the process were grouped together, in calculating the average values given in the table. In the table, all vapor flow rates and the volumes of uncondensed gaseous products have been calculated as for a perfect gas and expressed, in terms of volumes of gas per volume of the catalyst bed per hour, as of 0° C. and 760 mm. of mercury absolute pressure.

Table I

| Cycle Nos. | Time per Cycle, Hrs. | Reference Temp., °C. | Regeneration Feed Rates | | ΔC, °C. | Percent Conversion | Percent Selectivity of Catalyst | Gas Liters |
|---|---|---|---|---|---|---|---|---|
| | | | Air, v./v./hr. | Steam, v./v./hr. | | | | |
| 1 | 2 | 600 | 100 | 550 | 5 | 43 | 94 | 28.4 |
| 11–13 | 2 | 590 | 100 | 650 | 5 | 28 | 92 | 16.4 |
| 14–18 | 2 | 625 | 100 | 650 | 5 | 41 | 93 | 23.2 |
| 19–61 | 2 | 640 | 100 | 650 | 0 | 48 | 95 | 26.7 |
| 137–151 | 2 | 680 | 90 | 650 | 12 | 59 | 93 | 37.0 |
| 195–221 | 2 | 660 | 90 | 650 | 10 | 50 | 92 | 31.8 |
| 234–243 | 2 | 625 | 90 | 1,500 | 5 | 36 | 95 | 19.8 |
| 247–252 | 2 | 640 | 90 | 1,500 | 3 | 40 | 94 | 22.4 |
| 267–309 | 2 | 650 | 90 | 1,500 | 4 | 43 | 92 | 25.0 |
| 310–337 | 1 | 650 | 90 | 1,500 | 2.5 | 42 | 95 | 12.1 |
| 338–357 | 1 | 655 | 90 | 1,500 | 1.5 | 47 | 92 | 12.5 |
| 447–595 | 1 | 675 | 90 | 1,500 | 1 | 56 | 91 | 16.8 |
| 672–699 | 1 | 660 | 90 | 1,500 | 2 | 49 | 93 | 14.6 |
| 700–810 | 1 | 660 | 90 | 1,500 | 2 | 49 | 93 | 14.6 |
| 811–919 | 1 | 660 | 90 | 1,070 | 1 | 48 | 94 | 13.8 |
| 920–1130 | 1 | 665 | 90 | 1,070 | −5 | 51 | 92 | 15.5 |
| 1131–1219 | 1 | 665 | 90 | 650 | −12 | 49 | 93 | 15.5 |
| 1239–1264 | 1 | 625 | 150 | 650 | −5 | 37 | 94 | 9.5 |
| 1376–1417 | 1 | 635 | 150 | 500 | −1 | 38 | 95 | 10.3 |
| 1470–1532 | 1 | 650 | 150 | 500 | −3 | 44 | 94 | 12.1 |
| 1559–1586 | 1 | 655 | 175 | 500 | −4 | 46 | 93 | 12.9 |
| 1645–1669 | 1 | 640 | 200 | 500 | −5 | 33 | 96 | 9.5 |
| 1765–1794 | 1 | 655 | 255 | 500 | −9 | 45 | 94 | 12.9 |
| 1891–1937 | 1 | 655 | 300 | 500 | −14 | 44 | 94 | 12.9 |
| 2205–2298 | 1 | 655 | 110 | 670 | −33 | 49 | 91 | 13.8 |
| 2299–2313 | 1 | 655 | 1,000 | 6,000 | −18 | 46 | 87 | 12.1 |
| 2314–2426 | 1 | 655 | 500 | 3,000 | −25 | 45 | 94 | 14.6 |
| 2427–2431 | 1 | 655 | 500 | 1,570 | −29 | 47 | 94 | 14.6 |

Although there were periods in which excessive amounts of permanent gas were formed, or the values of "delta C" became larger than was desired, etc., the experiment as a whole was highly successful for each of a number of reasons. It demonstrated that the "delta C" values (which are one mode of expressing temperature changes in the catalyst bed during the regeneration steps) can be varied, controlled, and minimized by varying the relative and total amounts of n-butenes and oxygen alternately fed, together with steam, to the catalyst bed in accordance with the invention and that the alternate reactions for the reduction and oxidation of the catalyst can thus be limited in extent and brought into a condition of balance such as to maintain the catalyst in a highly active condition having a high selectivity value. Throughout a large part of the run the "delta C" values were maintained at 10° C. or less, which values are much smaller than are obtained at most times in the aforementioned conventional method for the manufacture of butadiene. The average n-butene conversion value for the experiment as a whole was 48.5 percent, which value is higher than can be used satisfactorily in the conventional method. The average rate of butadiene production per pound of catalyst in the entire experiment was about 50 percent greater than is obtained in the conventional method on the same basis. At the end of the experiment, the catalyst possessed high activity and selectivity values, i.e. it was still functioning as an effective catalyst for the production of butadiene. However the amounts of uncondensed gas formed varied from cycle to cycle during the last month of operation and the ability to control "delta C" had been lost. Since it appeared evident that the catalyst was near the end of its useful life this experiment was terminated and another experiment, described in Example 2, was started.

EXAMPLE 2

This experiment was for purpose of determining the effectiveness of the method of the invention in prolonging the useful life of a catalyst when using the latter under severe reaction conditions, i.e. at a higher than usual rate of butylene conversion per pass through a bed of the catalyst, for the production of butadiene. As hereinbefore mentioned, dehydrogenation catalysts of the calcium nickel phosphate type have heretofore been found to have a useful life of from 6 to 9 months of continuous service in a commercial process for the production of butadiene from normal butylenes at a conversion rate of about 35 percent of the butylene fed per pass through the catalyst bed. Attempts to use higher conversion rates in the conventional process (which involved occurrences of wide changes in the catalyst bed temperature, and large and uncontrolled temperature rises during the catalyst regeneration steps of the process) resulted in decreases in the selectivity and effective life of the catalyst. This prior experience serves as a basis for comparison with the results obtained in the present experiment. The granular catalyst employed in this experiment was a chromium oxide promoted calcium nickel phosphate catalyst which was similar in chemical composition and form to that employed in Example 1. It was a freshly formed catalyst that had been decarbonized by heat-treatment in a current of a mixture of steam and air and thereafter had been heated for 24 hours at 675° C. in a current of steam alone, so as to render it highly selective for the dehydrogenation of normal butylenes to form butadiene rather than by-products, prior to being used in this experiment. The apparatus was similar to that employed in Example 1, except that the 1 inch internal diameter reaction tube containing the bed of catalyst was wound on the outside with a wire through which sufficient electric current was passed to bring the tube walls close to the temperature of the catalyst bed during the dehydrogenation step of the process, and the tube and the windings were surrounded by thermal insulating material. However, it was found during the process, that considerable heat was lost (presumably by radiation and by conductance through said windings) from the narrow catalyst bed during the catalyst regeneration steps of the process. Accordingly, the hereinbefore-described corrected reference values were compared with the highest temperature reached in a lower portion of the catalyst bed (remote from the point of vapor feed) during the respective catalyst regeneration steps in determining the "delta C" values hereinafter given. The process involved repetitions of the usual operating cycle of: (1) passing superheated steam alone through the catalyst bed to sweep other gases from the bed; (2) passing a reaction mixture of about 20 molecular equivalents of steam and one molecular equivalent of normal butylenes through the bed at a flow rate (calculated as at 0° C. and 1 atmosphere pressure) of approximately 3000 volumes of this vapor mixture per bed volume of catalyst per hour; again passing steam alone through the catalyst bed to purge it of other gases; and passing a mixture of air and superheated steam through the bed to regenerate the catalyst by oxidizing and removing deposits of carbonaceous material that otherwise accumulate in the bed. Bed temperatures were measured by means of a thermocouple situated on the vertical axis and about 1 inch above the bottom of the bed. The temperatures of the above-mentioned feed vapors were approximately the same in all steps of each cycle of operations, but were occasionally raised or lowered from one cycle to another in an attempt to obtain, and maintain, about 50 percent conversion, i.e. consumption, of the butylene per pass through the bed of catalyst. The process was started using one hour for each cycle of operations, but at the end of the second month of practice of the process the time per cycle was reduced to 30 minutes and the catalyst selectivity, i.e. the yield of butadiene based on the amount of butylene consumed per cycle, was thereby improved. During part of the process a time per cycle of only 15 minutes was used. The time schedules for the successive steps in these respective operating cycles were:

*Table II*

| Total Cycle Time | 1 Hour | 30 Min. | 15 Min. |
|---|---|---|---|
| Minutes of Steam Purge | 4 | 2 | 2 |
| Minutes of Dehydrogenation | 30 | 15 | 7.5 |
| Minutes of Steam Purge | 4 | 2 | 2 |
| Minutes of Regeneration | 22 | 11 | 3.5 |

At the start of the process, the rates of feed of air and steam (expressed as at 0° C. and 1 atmosphere pressure) in the regeneration step of each cycle were 126 volumes of air and 2,000 volumes of steam per volume of the catalyst bed. However, these rates of feed during the regeneration step were varied from time to time as necessary in order to maintain a "delta C" value, for the difference between the corrected reference temperature and the maximum measured bed temperature reached during the respective catalyst regeneration steps, of not more than 10° C. It should be mentioned that the bed temperature changed considerably during each operating cycle and that it is said "delta C" value (not the full range of such bed temperature changes) that is maintained within 10° C. of the corrected reference value. When using a vapor feed temperature of 685° C. a typical schedule of bed temperature changes during an operating cycle were as follows:

*Table III*

| Time Min. | Step in Cycle | Bed Temp., °C. | Corrected Reference Value | Delta C, °C. |
|---|---|---|---|---|
| 0 | Steam Purge | 645 | | |
| 2 | do | 648 | | |
| 4 | Dehydrogenation | 642.5 | | |
| 8 | do | 641.8 | | |
| 12 | do | 640.0 | | |
| 16 | do | 639 | | |
| 18 | do | 638 | | |
| 18.5 | Steam Purge | 632.5 | | |
| 20 | do | 643.0 | | |
| 24 | Catalyst Regeneration | 644.0 | | |
| 26 | do | 645.0 | 644.3 | 1.7 |
| 30 | do | 646.0 | | |

The vapor mixture flowing from the catalyst bed during each butylene dehydrogenation step was cooled in stages to condense first the steam and thereafter the $C_4$ hydrocarbons and the latter were weighed and analyzed. Also, the volume of uncondensed gaseous products, such as hydrogen, methane, ethane, ethylene, etc., obtained in each dehydrogenation step was measured. Throughout the run, the rates of feed of butylene and steam in the dehydrogenation steps were as stated above. The following table gives data on a number of the operating cycles which illustrate changes in other reaction conditions, i.e. in the average of the vapor feed temperatures in each cycle, the changes in time per cycle, and the changes in rates of feed of steam and air in the catalyst regeneration steps, which were made in order to maintain "delta C" values of less than 10° C. In the table, negative values for "delta C" mean that the maximum measured bed temperature during the regeneration step was lower than the corrected reference value and positive "delta C" values mean said maximum bed temperature during regeneration was higher than the corrected reference value. The feed vapor volumes and the volumes of uncondensed gas are ones calculated as at 0° C. and 1 atmosphere pressure in units of the volume of the catalyst bed. The table gives, for each of the cycles, the "delta C" value which was determined; the volume, in liters, of uncondensed gaseous products; the percent conversion, i.e. the percent of the butylene fed which was consumed; and the percent yield of butadiene, based on the amount of butylene consumed. In the table butadiene is designated as $C_4H_6$.

*Table IV*

| Cycle No. | Length of Cycle, Minutes | Ave. Feed Temp., °C. | Feed Rates During Regeneration | | Percent Conversion | Delta C, °C. | Liters of Uncondensed gas | Percent Yield of $C_4H_6$ |
|---|---|---|---|---|---|---|---|---|
| | | | Air v./v. of Catalyst/hr. | Steam v./v. of Catalyst/hr. | | | | |
| 1 | 60 | 533 | 126 | 2,000 | 16 | −3 | 3.9 | 96.5 |
| 141 | 60 | 607 | 126 | 2,000 | 34 | −2 | 9.5 | 92 |
| 150 | 60 | 620 | 126 | 1,500 | 37.5 | −2 | 10.3 | 92 |
| 213 | 60 | 660 | 132 | 750 | 50 | 7 | 13.8 | 92 |
| 465 | 60 | 682 | 104 | 750 | 49.5 | 8 | 13.8 | 92 |
| 555 | 60 | 668 | 104 | 750 | 48.5 | 6 | 13.8 | 90 |
| 749 | 60 | 673 | 104 | 750 | 50.5 | 5 | 15.5 | 87.5 |
| 819 | 60 | 681 | 125 | 750 | 43 | 5 | 12.0 | 91 |
| 1,169 | 60 | 685 | 150 | 750 | 52.5 | 4 | 16.3 | 86 |
| 1,195 | 60 | 684 | 150 | 1,500 | 50 | −2 | 14.6 | 90.5 |
| 1,460 | 60 | 683 | 150 | 1,500 | 50 | −2 | 14.6 | 89.5 |
| 1,556 | 60 | 683 | 150 | 750 | 56 | 6 | 18.1 | 80 |
| 1,575 | 30 | 684 | 150 | 750 | 52 | 5 | 8 | 89.5 |
| 1,923 | 30 | 684 | 150 | 1,500 | 51.5 | −1 | 7.5 | 91.5 |
| 2,341 | 30 | 683 | 150 | 1,375 | 51 | −1 | 7.5 | 92 |
| 2,482 | 30 | 685 | 150 | 1,250 | 51 | 0 | 7.5 | 92.5 |
| 9,431 | 30 | 685 | 150 | 1,250 | 36.5 | 2 | 4.8 | 95.5 |
| 9,860 | 15 | 684 | 150 | 1,250 | 34.5 | 7 | 2.4 | 96.5 |
| 10,411 | 15 | 685 | 75 | 3,000 | 32.5 | 4 | 2.3 | 96.5 |
| 12,762 | 15 | 685 | 75 | 3,000 | 40 | 4 | 2.8 | 96 |
| 14,500 | 15 | 684 | 75 | 3,000 | 44.5 | 2 | 3.0 | 95.5 |
| 15,334 | 30 | 684 | 75 | 3,000 | 45.5 | −2 | 6.1 | 95 |
| 18,348 | 30 | 671 | 75 | 3,000 | 45 | −4 | 5.9 | 95.5 |
| 18,564 | 30 | 666 | 75 | 1,250 | 43.5 | 4 | 5.8 | 95 |
| 29,500 | 30 | 667 | 150 | 1,250 | 46.5 | 2 | 6.1 | 96 |

Operation in the manner just described was carried out for a total of about 20 months. At the end of this time the catalyst was satisfactorily active and highly selective in causing the dehydrogenation of butylene to form butadiene rather than by-products, i.e. toward the end of the run butadiene was being formed in greater than 90 percent yield based on the amount of butylene consumed. In the run as a whole a total of 30,000 operating cycles were carried out; the average conversion of butylene per pass through the catalyst bed was 45.7 percent; and a total of 1100 pounds of butadiene was formed per pound of the catalyst.

EXAMPLE 3

A further test of the invention was carried out on a scale similar to that which would be employed for commercial practice. Two catalyst chambers, each containing a catalyst bed 4 feet in diameter and 6 feet deep, were arranged in parallel and one was regenerated while the other was being employed for the dehydrogenation reaction, and vice versa, so as to obtain substantially continuous production of butadiene from the normal butylene feed material. The catalyst was similar in composition and form to that employed in Example 2. A thirty minute operating cycle, similar to that described in Example 2, was repeatedly carried out with each catalyst bed. Temperatures measured at the center of the bed were employed for determination of the "delta C" values. The vapor feed temperatures were varied from time to time during the run in an exploratory manner, and there were periods in which the vapor feed temperature during a catalyst regeneration step was considerably different from, e.g. higher than, the vapor feed temperature in the butylene dehydrogenation step of the same cycle of operations. The average of these vapor feed temperatures was employed as a reference value in determining the "delta C" value in said cycle as hereinbefore described. Throughout most of the run the vapor feed temperatures were varied within a range of from 600 to 670° C. The relative rates of feed of butylene and air in the regeneration and butylene dehydrogenation steps and the proportion of steam in the vapor feed mixtures employed in the regeneration steps were varied as hereinbefore described so that in most, i.e. well over 70 percent, of the catalyst regeneration steps, the "delta C" values were prevented from exceeding 10° C. Operation in this manner was carried out for a total of about 10 months. The average percent conversion of butylene per pass through the catalyst beds throughout the last six months of operation was about 43 percent. Throughout this time, the catalyst remained satisfactorily active and highly selective in promoting the dehydrogenation of butylene to form butadiene rather than by-products. In the tenth month of operation of the process a valve for controlling the feed rate of steam became stuck with a result that the steam flow was insufficient and the beds of catalyst quickly became fouled with carbonaceous material to an extent rendering them unfit for further use. The process was then terminated. The average yield of butadiene was greater than 90 percent of theoretical, based on consumed butylene, and yields of this order were obtained up to the time when the above-mentioned mechanical difficulty, i.e. a stuck steam valve, occurred. It is estimated that a total of between 400 and 500 pounds of butadiene was produced per pound dry weight of the catalyst.

I claim:

1. In a method for the production of an aliphatic conjugated diolefine wherein there are repeatedly carried out under substantially adiabatic conditions alternate dehydrogenation and catalyst regeneration steps of passing at reaction temperatures through a bed of a granular calcium nickel phosphate catalyst, respectively: (1) a vapor mixture of steam and an olefine having in its molecule at least 4 carbon atoms in a carbon chain containing the olefinic linkage and (2) a vapor mixture comprising steam and elemental oxygen, the improvement of preventing, for more than 70 percent of the time over which the method is carried out, occurrence of a temperature difference of more than 10° C. between the highest temperature reached in a portion of the bed remote from the point of vapor feed during the catalyst regeneration step and the average of the temperatures of the feed vapors in both of the above steps of an operating cycle by increasing, from one cycle to another, the ratio of reactive oxygen to the olefine in which these gases are alternately fed, together with steam, to the catalyst bed when an increase in the amount of heat generated in the bed during the catalyst regeneration steps is necessary in order to bring the above-mentioned temperature difference within the range stated above and decreasing said ratio when a decrease in the amount of heat generated in the bed during the catalyst regeneration steps is necessary in order to bring said temperature difference within said range, and continuing operation in the manner just described until a total of at least 400 pounds of a diolefine has been formed per pound of the catalyst.

2. In a method for the production of an aliphatic conjugated diolefine wherein there are repeatedly carried out under substantially adiabatic conditions alternate dehydrogenation and catalyst regeneration steps of passing at reaction temperatures through a bed of a granular calcium nickel phosphate catalyst, which bed has a minimum linear dimension of at least 2 feet, respectively: (1) a vapor mixture of steam and an olefine having in its molecule at least 4 carbon atoms in a carbon chain containing the olefinic linkage and (2) a vapor mixture comprising steam and elemental oxygen, the improvement of preventing, for at least 85 percent of the time over which the process is carried out, occurrence of a temperature difference of more than 10° C. between the highest temperature reached in the central portion of the bed during the catalyst regeneration step and the average of the temperatures of the vapors which are fed to the bed in both of the above steps of an operating cycle by increasing, from one cycle to another, the ratio of reactive oxygen to the olefin in which these gases are alternately fed, together with steam, to the catalyst bed when an increase in the amount of heat generated in the bed during the catalyst regeneration steps is necessary in order to bring the above-mentioned temperature difference within the range stated above and decreasing said ratio when a decrease in the amount of heat generated in the bed during the catalyst regeneration steps is necessary in order to bring said temperature difference within said range, and continuing operation in the manner just described until a total of at least 400 pounds of a diolefine has been formed per pound of the catalyst.

3. A method, as claimed in claim 2, wherein the proportion of oxygen in the vapor mixtures comprising steam and oxygen that are fed in the catalyst regeneration steps is increased when an increase in the extent of the catalyst bed temperature rises during such steps is required and is decreased when a decrease in the extent of the bed temperature rises during the catalyst regeneration steps is required.

4. A method, as claimed in claim 2, wherein the calcium nickel phosphate catalyst is one comprising chromium oxide as a promoter, the changes in the relative effective proportions in which the olefine and oxygen are alternately fed, each together with steam, to the bed of catalyst is accomplished by increasing the proportion of oxygen in the vapor mixtures which are fed to the bed during the catalyst regeneration steps when an increase in the extent to which the bed temperature rises during said steps is required and decreasing the proportion of oxygen in said vapor mixtures when a decrease in the extent of the bed temperature rises during the catalyst regeneration steps is required.

5. A method, as claimed in claim 2, wherein the amounts of the olefin and oxygen fed per cycle of the process and the proportion of oxygen in the vapor mixtures comprising steam and oxygen that are fed in the catalyst regeneration steps are increased when an increase in the extent bed temperature rises during said steps is required and are decreased when a decrease in extent of said bed temperature rises is required.

6. A method, as claimed in claim 2, wherein at least one of the isomeric normal butylenes is fed to the dehydrogenation reaction and 1,3-butadiene is formed as a product.

7. A method, as claimed in claim 2, wherein the calcium nickel phosphate catalyst is one comprising chromium oxide as a promoter.

8. A method, as claimed in claim 2, wherein the calcium nickel phosphate catalyst is one comprising chromium oxide as a promoter, at least one of the isomeric normal butylenes is fed to the dehydrogenation reaction and 1,3-butadiene is formed as a product, and the proportion of oxygen in the vapor mixtures comprising steam and oxygen that are fed to the catalyst bed during the catalyst regeneration steps is increased when an increase in the extent of the catalyst bed temperature rises during such steps is required and is decreased when a decrease in the extent of the bed temperature rises during the catalyst regeneration steps is required.

9. A method as claimed in claim 2, wherein vapor mixtures of steam and air are fed to the catalyst bed during the catalyst regeneration steps.

10. A method, as claimed in claim 2, wherein the calcium nickel phosphate catalyst is one containing chromium oxide as a promoter, at least one of the isomeric normal butylenes is fed to the dehydrogenation reaction and 1,3-butadiene is formed as a product, vapor mixtures of steam and air are fed to the catalyst bed during the catalyst regeneration steps, and the proportion of air in the vapor mixtures of steam and air fed in the catalyst regeneration steps is increased when an increase in the extent of the catalyst bed temperature rises during such steps is required and is decreased when a decrease in the extent of the bed temperature rises during the catalyst regeneration steps is required.

11. A method, as claimed in claim 2, wherein the calcium nickel phosphate catalyst is one containing chromium oxide as a promoter, at least one of the isomeric normal butylenes is fed to the dehydrogenation reaction and 1,3-butadiene is formed as the principal product, vapor mixtures of steam and air are fed to the catalyst bed during the catalyst regeneration steps, and the amounts of butylene and air fed per cycle of the process and the proportion of air in the vapor mixtures of steam and air fed in the catalyst regeneration steps are increased when an increase in the extent of the catalyst bed temperature rises during such steps is required and are decreased when a decrease in the extent of the bed temperature rises during the catalyst regeneration steps is required.

References Cited in the file of this patent

UNITED STATES PATENTS

| | | |
|---|---|---|
| 2,270,165 | Groll et al. | Jan. 13, 1942 |
| 2,391,327 | Mekler | Dec. 18, 1945 |
| 2,406,112 | Schulze | Aug. 20, 1946 |
| 2,456,368 | Britton et al. | Dec. 14, 1948 |
| 2,609,345 | Easly et al. | Sept. 2, 1952 |
| 2,664,404 | Blatz et al. | Dec. 29, 1953 |
| 2,884,473 | Reilly et al. | Apr. 23, 1959 |

OTHER REFERENCES

Britton et al.: Ind. and Engr. Chem., vol 43 (1951), pp. 2871–2874.